United States Patent [19]

Scarlett et al.

[11] 4,248,626
[45] Feb. 3, 1981

[54] METHOD FOR PRODUCING MOLTEN IRON FROM IRON OXIDE WITH COAL AND OXYGEN

[75] Inventors: John C. Scarlett, Toledo, Ohio; Charles W. Sanzenbacher, Charlotte, N.C.

[73] Assignee: Midrex Corporation, Charlotte, N.C.

[21] Appl. No.: 57,933

[22] Filed: Jul. 16, 1979

[51] Int. Cl.$^3$ .............................................. C21B 13/06
[52] U.S. Cl. ........................................................ 75/38
[58] Field of Search ...................................... 75/38, 40

[56] References Cited

U.S. PATENT DOCUMENTS

| | | | |
|---|---|---|---|
| 2,919,983 | 1/1960 | Halley | 75/38 |
| 3,918,958 | 11/1975 | Heitmann | 75/38 |

Primary Examiner—M. J. Andrews
Attorney, Agent, or Firm—Ralph H. Dougherty

[57] ABSTRACT

A method and apparatus for reducing particulate iron oxide and producing molten iron in which coal and oxygen are impinged onto a molten iron bath in a closed vessel to melt the iron and gasify the coal. The hot off gas from the vessel is removed and used as the reductant in a counterflow shaft furnace to reduce iron oxide pellets and/or iron ore in a continuous manner. The hot reduced product from the shaft is discharged directly into the molten iron bath and melted.

6 Claims, 1 Drawing Figure

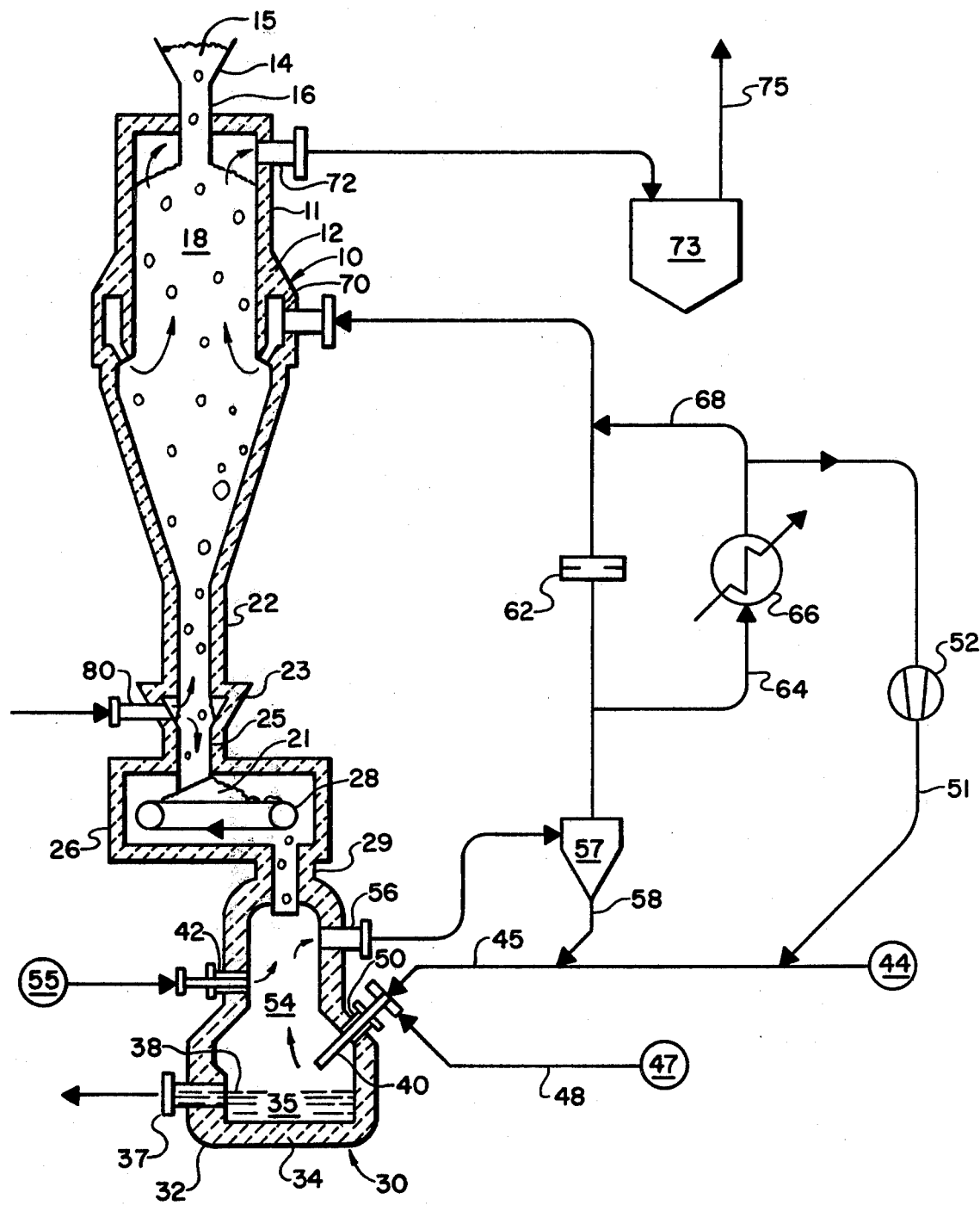

METHOD FOR PRODUCING MOLTEN IRON FROM IRON OXIDE WITH COAL AND OXYGEN

BACKGROUND OF THE INVENTION

The direct reduction of iron oxide to metallic iron has become a worldwide reality, and direct reduced iron is a commercially accepted feed material in iron and steelmaking.

Direct reduced iron, or sponge iron, is particularly well suited for electric arc furnace technology. It is not suitable as the principal feed material for other steelmaking furnaces, such as the bottom blown oxygen process, which require hot metal or molten metal, as feed material. At present, such hot metal is produced commercially only by means of blast furnaces which are inherently tied to the availability of coking coal and to integrated steelmaking installations. It is, therefore, desirable to produce molten iron by direct reduction means which are economically suitable for small steelmaking installations and are independent of the use of coking coal.

The present invention accomplishes this end by (1) producing hot direct reduced iron (DRI) from particulate iron oxide in an efficient counterflow shaft furnace, (2) discharging the hot DRI into a molten bath of iron in a melter-gasifier chamber, (3) impinging coal and oxygen onto the molten bath to supply heat to melt the hot DRI and gasify the coal, and (4) passing off the gases from the melter-gasifier through the shaft furnace to reduce the iron oxide. The process is simple, efficient, nonpolluting, economical for small steelmaking installations, and suitable for use with noncoking coals which are available worldwide.

OBJECTS OF THE INVENTION

It is the principal object of the present invention to provide a practical method for directly reducing particulate iron oxide to molten iron utilizing solid fuel as the principal source of reductant.

It is another object of the invention to provide an energy efficient method for converting particular iron oxide to molten iron in counterflow heat exchange by reaction with gaseous reductants produced from solid fuel and oxygen.

It is another object of the invention to provide a method for producing molten iron from particulate iron oxide in a simple once-through process requiring no supplementary or expensive systems to remove carbon dioxide and sulfur constituents from the reductant gases.

It is also an object of the invention to provide a method for producing molten iron and simultaneously producing a clean gaseous fuel of substantially 1900 kcal/Nm$^3$ heating value.

It is another object of this invention to provide apparatus for carrying out the above methods.

SUMMARY OF THE INVENTION

The objects of the invention are achieved by directly reducing particulate iron oxide in a shaft furnace to form hot metallized iron particulates, melting the hot particulates in a melter-gasifier vessel into which solid fuel and oxygen are injected to impinge upon the surface of a molten iron bath, and hot off gases formed in the vessel are recirculated to the shaft furnace to reduce the particulate iron oxide therein.

BRIEF DESCRIPTION OF THE DRAWING

The present invention will be more readily understood by referring to the following detailed description and the appended drawing in which: the single FIGURE is a schematic illustration of a shaft furnace, melting vessel and related equipment in accordance with the present invention.

DETAILED DESCRIPTION

Referring now to the drawing, a shaft furnace 10 having a steel shell 11 is lined with refractory 12. A feed hopper 14 is mounted at the top of the furnace 10 for charging of particulate solids feed material 15 therein. The feed material consists of iron oxide in the form of pellets or lumps. The feed material descends by gravity through one or more feed pipes 16 to form a packed bed or burden 18 of particulate solids feed material in the furnace 10. Reduced particulate material 21 is withdrawn from furnace 10 through furnace discharge pipe 22 into sealing chamber 23, then through discharge pipe 25 into conveyor chamber 26 by means of a discharge conveyor 28, the speed of which controls the rate of descent of the burden through furnace 10. Discharge conveyor 28 is the primary iron bearing solids metering device for the process.

Reduced particulate material 21 falls freely from discharge conveyor 28 through radiation shield pipe 29 into melter-gasifier vessel 30 having a steel shell 32 and being lined with refractory 34. Radiation shield pipe 29 serves to minimize heat radiation from the interior of melter-gasifier vessel 30, the temperature of which is about 1200° C., to discharge conveyor chamber 26 in which the temperature is about 800° C. This prevents reduced particulate material from overheating and becoming sticky and non-free-flowing.

Reduced particulate material 21 falls into molten bath 35 and is melted. Reduced molten product is removed from melting vessel 30 through iron notch 37. Removal of the molten product from vessel 30 is intermittent or continuous but coordinated to the discharge of reduced particulate material 21 from furnace 10, which is normally continuous, to maintain a liquid level 38 in vessel 30 beneath coal and oxygen injection pipes 40 (only one of which is shown) and well below water injection pipes 42 (only one of which is shown).

As described, all iron bearing materials descend in gravitational flow from the feed hopper 14 to iron notch 37. All non-iron-bearing materials ascend through the melter-gasifier 30 and the shaft furnace 10 in a counterflow relationship to the descending iron bearing materials. This allows the most efficient use of energy for producing molten iron from coal and oxygen by a simple method.

Each injection pipe 40 is a dual passageway pipe having a central fossil fuel passageway communicating with a source of fossil fuel 44 by pipe 45 and an annular oxygen passageway communicating with a source of oxygen 47 through pipe 48. Pulverized coal or other carbonaceous material is pneumatically conveyed to the injection pipe 40, which extends through opening 50 in the side wall of melter-gasifier 30, by a small stream of compressed gas from pipe 51. Preferably, process gas is compressed by compressor 52 and used as the conveying media. The conveyed powdered coal is injected through the center pipe of injection pipe 40 and onto the surface of molten bath 35 at a point slightly above the elevation of liquid level 38. It is desirable to maintain the liquid level elevation slightly below pipe 40 so that the stream of coal and oxygen impinge on the surface of the molten product which insures good heat transfer and stable combustion of coal. Oxygen from source 47 is compressed to a suitable pressure and injected through the annular pipe of injection pipe 40 so that the streams of oxygen and powdered coal meet at the exits of their respective pipes at the discharge of injection pipe 40. Coal is combusted with oxygen on and above the surface 38 of molten bath 35. The combustion of coal and oxygen is exothermic, and sufficient heat is released to melt the hot particulate material 21 in vessel 30. The ratio of coal to oxygen is controlled to cause combustion to occur at a theoretical adiabatic flame temperature of about 1950° C. The quantity of coal combusted is controlled according to the quantity of reduced particulate material as measured by means of discharge conveyor 28. The ratio of coal to reduced particulate material is adjusted to maintain the proper quantity of melter-gasifier off-gas to reduce all iron oxide to metallic iron in furnace 10.

Hot, reductant-rich-off gas 54 leaves the surface 38 of molten iron bath 35 at a temperature of about 1400° C. The quality (ratio of reductants to oxidants) and temperature of the gas are both higher than desirable for use in the shaft furnace. Therefore, liquid water from source 55 is injected through water nozzles 42 to reduce the off-gas temperature to about 1200° C. and humidify the hot off-gas to obtain the desired quantity of gas for reduction purposes. The humidified off-gas leaves the top of the melter-gasifier 30 through outlet pipe 56. Hot solids are separated from the humidified off-gas in a cyclone separator 57. The separated solids may be recycled to the melter-gasifier by injecting them through pipe 58 into pipe 45 with the pulverized coal.

Humidified off-gas leaving the cyclone separator 57 via pipe 60 is further cooled to obtain the desired temperature of gas for reduction purposes. Hot gas passes through a restrictive orifice 62 which allows only a controlled quantity of gas to pass therethrough. The remainder, also a controlled quantity of gas is diverted through pipe 64 then passes through a water cooled heat exchanger 66 wherein the gas is cooled. A portion of the cooled gas is diverted to pipe 51 to provide compressed gas for coal injection line 45. The remainder of the cooled gas passes through pipe 68 and is recombined with the stream of hot gas in pipe 69. The temperature of the reducing gas in pipe 69 is controlled by automatically adjusting the flow of cold by-passed gas from pipe 68. Heat exchanger 66 may be of the direct or indirect type. No steam is required for the process; however, if it is desirable to generate steam for use elsewhere, a waste heat boiler may be used. If steam generation is not desired, a simple direct water cooler may be used for heat exchanger 66.

The recombined reducing gas having the desired temperature, quality, and quantity for reduction, enters the shaft furnace 10 through a bustle and tuyere system 70. The reducing gas flows inward and upwards through the descending burden 18 to heat the particulate iron oxide and reduce it to metallic iron. In the reaction of reducing iron oxide to iron, the reducing gas becomes partially oxidized and cooled. The partially oxidized and cooled gas leaves the reduction shaft furnace 10 through furnace off-gas outlet pipe 72 into water-cooled scrubber 73 wherein it is cooled and scrubbed free of dust. Cool, clean furnace off-gas removed by pipe 75 contains CO and $H_2$ and has a heating value of about 1900 Kcal/$Nm^3$. This is a valuable gaseous fuel for use throughout the steel mill, or elsewhere.

Oxygen and coal are introduced into the melter-gasifier 30 at sufficiently high pressure to overcome the pressure drop created by the flow of gases through the melter-gasifier and shaft furnace systems, and to deliver off-gas fuel at a usable pressure. The gas pressure in gasifier-melter 30 is higher than in shaft furnace 10; therefore, a quantity of cold inert gas is introduced through inlet pipe 80 into plenum chamber 23 between furnace discharge pipe 22 and seal chamber discharge pipe 25. The pressure in chamber 23 is maintained slightly higher than the pressure in the bottom of shaft furnace 10 and in discharge conveyor chamber 26 so that some cold inert seal gas flows upwards into shaft furnace 10 and downwards into discharge conveyor chamber 26. This prevents 1200° C. gases from the melter-gasifier 30 from flowing directly upwards into the bottom of the shaft furnace.

The present invention employs a totally counterflow continuous process to most efficiently use non-coking solid fuels to produce molten iron from particulate iron oxide and, at the same time, produce valuable gaseous fuel.

To demonstrate the practicability of the invented process we have developed a process analysis which is summarized in Tables 1, 2 and 3. The analysis is based on use of a typical Western U.S.A. sub-bituminous coal as the carbonaceous material.

Reducing gas quality is defined as the ratio of reductants (CO plus $H_2$) to oxidants ($CO_2$ plus $H_2O$) in the gas mixture. In order to take full advantage of the inherent chemical efficiency of a counterflow shaft reduction furnace, the quality of the hot reducing gas should be at least about 8.

Operation temperatures in a shaft furnace vary between 760° and 900° C., and dependent on the specific particulate iron oxide material being reduced. A practical operating temperature for most materials is 815° C.

TABLE 1

| | GAS FLOWS AND TEMPERATURES | | | |
|---|---|---|---|---|
| ITEM | REFERENCE NUMERAL | FLOW IN $Nm^3$* | GAS QUALITY | GAS TEMP. °C. |
| Oxygen | — | 576 | — | 50 |
| Melter-Gasifier Gas Humidified | 54 | 1869 | 16.9 | 1400 |
| Melter-Gasifier Gas | 56 | 2014 | 8.0 | 1200 |
| By-Passed Gas | 64 | 741 | 8.0 | 60 |
| Reducing Gas | 69 | 1983 | 8.0 | 815 |
| Furnace Off Gas | 72 | 1983 | 1.4 | |
| Clean Off Gas Fuel | 75 | 1850 | | 60 |

*$Nm^3$ - normal cubic meters.

TABLE 2

| | FEED AND ENERGY REQUIREMENTS | | | |
|---|---|---|---|---|
| ITEM | REFERENCE NUMERAL | $Nm^3$ | kg | Gcal |
| Coal | 44 | — | 1055 | 6.71 (HHV) |
| Oxygen | 47 | 576 | — | 1.01* |
| Oxide | 15 | — | 1420 | — |
| Humidifying water | 55 | — | 117 | — |
| Off Gas Fuel | 75 | 1850 | — | (3.47) |
| Net Energy Required | — | — | — | 4.25 |

*Energy (HHV) of coal required to produce 576 $Nm^3O_2$ at 30% efficiency.

Because of the chemical thermodynamics involved in the reduction of iron oxide to metallic iron, only a portion of the initial reductants (CO plus $H_2$) can be reacted before the oxidants ($CO_2$ plus $H_2O$) which are formed cause the reduction reactions to cease. This thermodynamic situation results in the spent reducing gas leaving the shaft furnace through outlet 72 having a quality of about 1.5 for an efficiently operating furnace. Therefore, reducing gas with a quality of 8 is oxidized to a quality of 1.5 in the reduction process. The amount of CO plus $H_2$ thus consumed determines the quantity of reducing gas required. A reducing gas quantity of 1800 to 2100 $Nm^3/t$ of reduced iron product is practical for efficient operation.

Each ton of molten iron product discharged from the melter-gasifier 30 requires that 1.035 tons of direct reduced particulate material be charged into the melter-gasifier. Typical metallization of direct reduced material is 92%. Material is delivered to the melter-gasifier at 700° C. Molten iron product is discharged at 1350° C. Therefore, sufficient heat must be generated in the melter-gasifier to heat the 700° C. incoming direct reduced material to 1350° C., reduce residual FeO to iron, reduce $SiO_2$, MnO, $P_2O_5$, etc., increase carbon, heat slag materials to 1350° C., and satisfy heat losses from the system. This requires 403,000 Kcal per ton of molten iron product. The heat required is furnished by the exothermic reaction of coal and oxygen within the melter-gasifier and cooling the products of combustion to 1400° C.

Table 3 shows gas analyses at the indicated positions in the process.

TABLE 3

GAS ANALYSES THROUGHOUT PROCESS

| ITEM | REFERENCE NUMERAL | % CO | % $CO_2$ | % $H_2$ | % $H_2O$ | % $N_2$ |
|---|---|---|---|---|---|---|
| Melter-Gasifier Gas | 54 | 66.9 | 2.3 | 26.2 | 3.2 | 1.4 |
| Reducing Gas | 69 | 63.0 | 2.2 | 24.7 | 8.8 | 1.3 |
| Furnace Off Gas | 72 | 36.6 | 28.1 | 21.7 | 12.3 | 1.3 |
| Clean Off Gas Fuel | 75 | 38.8 | 29.8 | 23.0 | 6.0 | 2.4 |

Although the preferable fossil fuel to be injected through line 45 is non-coking coal or lignite, the process can also be operated with coking coal, char or coke. The injected solid fossil fuel must be pulverized to a particle size finer than one quarter inch. Alternatively, the process can be operated with a liquid petroleum derived fossil fuel or a gaseous fossil fuel such as natural gas.

SUMMARY OF THE ACHIEVEMENT OF THE OBJECTS OF THE INVENTION

From the above, it can readily be seen that the present invention is a counterflow continuous apparatus and process for the direct reduction of particulate iron oxide to molten iron which efficiently uses non-choking solid fossil fuels as the principal source of reductant, and which simultaneously produces a valuable gaseous fuel for use elsewhere.

What is claimed is:

1. A method for reducing particulate iron oxide and producing molten iron, comprising:
    a. impinging fossil fuel and oxygen onto the surface of a molten iron bath to melt the iron and to gasify the fossil fuel to form a hot off gas within a chamber;
    b. humidifying and partially cooling the hot off gas within said chamber to form a hot reducing gas;
    c. withdrawing said hot reducing gas from said chamber and introducing the hot reducing gas into an iron-oxide containing shaft type furnace as reductant to directly reduce particulate iron oxide to a hot, highly metallized, particulate iron product; and
    d. discharging the hot, highly metallized, particulate iron product into said chamber to be melted and form the molten iron bath.

2. A method according to claim 1 wherein a reacted off gas is formed in said furnace, further comprising removing said reacted off gas from said furnace, and cleaning and cooling the removed gas to produce a gaseous fuel.

3. A method according to claim 1 wherein said fossil fuel is in solid form.

4. A method according to claim 3 wherein said solid fuel is selected from the group consisting of coal, lignite and char.

5. A method according to claim 1 wherein said fossil fuel is in the liquid or gaseous state.

6. A method according to claim 1 wherein indirect cooling is employed in step (b) to produce steam as a by-product of the method.

* * * * *

UNITED STATES PATENT AND TRADEMARK OFFICE
CERTIFICATE OF CORRECTION

PATENT NO. : 4,248,626
DATED : February 3, 1981
INVENTOR(S) : John C. Scarlett; Charles W. Sanzenbacher It is certified that error appears in the above—identified patent and that said Letters Patent is hereby corrected as shown below:

Column 1, Line 30, change "passing off the gases" to -- passing the off gases --.

Column 1, line 43, change "particular" to -- particulate -- .

Column 3, line 29, change "quantity" to -- quality -- .

Column 4, line 37, change "dependent" to -- depend -- .

Column 6, line 10, change "choking" to -- coking -- .

Signed and Sealed this

Tenth Day of November 1981

[SEAL]

Attest:

Attesting Officer

GERALD J. MOSSINGHOFF

Commissioner of Patents and Trademarks